United States Patent
Garcia et al.

(10) Patent No.: US 6,557,420 B1
(45) Date of Patent: May 6, 2003

(54) HAND RAIL TESTING APPARATUS

(75) Inventors: Romeo E. Garcia, Lafayette, LA (US); Michael Lanclos, Carencro, LA (US)

(73) Assignee: Ensco International Incorporated, Dallas, TX (US)

(*) Notice: Subject to any disclaimer, the term of this patent is extended or adjusted under 35 U.S.C. 154(b) by 232 days.

(21) Appl. No.: 09/675,409

(22) Filed: Sep. 29, 2000

(51) Int. Cl.[7] ............................. G01N 3/20; G01N 3/02
(52) U.S. Cl. ........................................ 73/849; 73/856
(58) Field of Search .................... 73/849, 760, 856

(56) References Cited

U.S. PATENT DOCUMENTS

| | | | |
|---|---|---|---|
| 1,650,789 A | 11/1927 | Doolittle | |
| 2,854,847 A | 10/1958 | Brady | 73/100 |
| 3,008,328 A | 11/1961 | Cope | 73/100 |
| 3,575,046 A | 4/1971 | Shattles et al. | 73/95 |
| 4,358,962 A | 11/1982 | Ashby et al. | 73/849 |
| 4,982,609 A * | 1/1991 | Talley, III | 73/849 |
| 5,051,919 A | 9/1991 | Deuar | 364/508 |
| 5,067,353 A | 11/1991 | Sersen | 73/849 |
| 5,212,654 A | 5/1993 | Deuar | 364/508 |
| 5,390,550 A * | 2/1995 | Miller | 73/862.391 |
| 5,452,617 A * | 9/1995 | Brown, Jr. | 73/862.23 |
| 5,659,141 A | 8/1997 | DeSpain | 73/862.68 |
| 5,850,043 A | 12/1998 | Robinett | 73/786 |

FOREIGN PATENT DOCUMENTS

| | | | |
|---|---|---|---|
| DE | 42 23 366 A1 | 1/1994 | |
| DE | 195 40 319 C1 | 4/1997 | |
| EP | 0 288 100 | 10/1988 | |
| EP | 0288100 A1 * | 10/1988 | E04G/21/32 |
| EP | 0 638 794 A1 | 2/1995 | |
| GB | 2 091 888 A | 8/1982 | |
| JP | 62134531 | 6/1987 | |
| JP | 02016608 | 1/1990 | |
| JP | 49089711 A | 9/1997 | |
| JP | 2001146830 | 5/2001 | |
| JP | 2001201303 | 7/2001 | |
| WO | WO 98/31999 | 7/1998 | |

OTHER PUBLICATIONS

ISR, PCT/US 01/42376; Mar. 25, 2002 Date Mailed.
Safety Alert No. 189; Guardrails; U.S. Department of the Interior Mineral Management Service Gulf of Mexico OCS Region; Published Jul. 19, 2000.

* cited by examiner

Primary Examiner—Hezron Williams
Assistant Examiner—Lilybett Martir
(74) Attorney, Agent, or Firm—Jenkens & Gilchrist, P.C.

(57) ABSTRACT

An apparatus for testing the structural integrity of a hand rail structure. The hand rail having a plurality of substantially horizontal parallel rail members. The apparatus has an elongate lever arm and a mounting portion on the lever arm. The mounting portion is sized to span at least two rail members. A receptacle on the mounting portion opposite the lever arm receives one of the rail members and vertically supports the lever arm and mounting portion. A force is applied through the lever arm and transmitted to the hand rail. The force is measured by a torque wrench on the lever arm.

21 Claims, 2 Drawing Sheets

HAND RAIL TESTING APPARATUS

TECHNICAL FIELD

This invention relates in general to a testing safety apparatus, and more specifically to a device for testing the structural integrity of safety hand rail structures.

BACKGROUND OF THE INVENTION

In any industrial setting, safety is a prime concern. It is important to ensure that the safety devices installed to protect workers and others on a job site perform as designed, and also comply with any applicable safety regulations such as those issued by the Occupational Safety and Health Administration (OSHA), and in the case of offshore vessels the U.S. Coast Guard and the American Bureau of Shipping (ABS). It is also important to ensure that the devices continue to perform as designed throughout their life span. One way to ensure that the safety devices are functioning properly is to test the devices both after manufacture and periodically during use.

When workers and others have access to a raised area, it is sensible to equip the area with hand rails to prevent a possible fall. Additionally, regulatory agencies, such as OSHA, require that fall protection, such as a hand rail, be present in most situations where a worker could fall six feet or more, and sets out strength requirements for the hand rails. While hand rails can be designed to safely support a worker and meet the regulatory standards, it is possible that the finally constructed hand rail could not meet the criteria because of defects in the manufacturing. Therefore, to ensure a safe hand rail and regulatory compliance, it is desirable to test the hand rail upon installation.

Hand rails are often subject to adverse environmental conditions such as salt, sun, and sometimes corrosive chemicals which may deteriorate the strength of an otherwise adequate design. Additionally, the hand rails are sometimes abused and subject to unanticipated loads and impact loads which may damage the railing. To ensure the hand rails remain safe and are adequate for the intended purpose, it is desirable to periodically test the hand rails in service and after any repairs.

Testing the hand rail on site, as discussed above, presents several difficulties which must be overcome to make a hand rail testing apparatus practical. Although some minimum dimensions for hand rails are regulated, hand rails are built in many shapes and from many different material cross-sections. Therefore, a hand rail testing apparatus should be able to accommodate as many hand rail configurations as possible. Many times a worker must carry the hand rail testing apparatus a significant distance, and up stairs and ladders. Additionally, most hand rails are located in confined areas, where space for using the handrail testing apparatus is limited. Thus, a hand rail testing apparatus should be light weight to minimize the strain imposed on the worker when transporting the testing apparatus. Also, a hand rail testing apparatus should be relatively compact, so that it may be used in tight quarters. Finally, it is helpful that the hand rail testing apparatus be easy and inexpensive to construct, so that multiple testing apparatus can be used at different sites.

One device for testing the strength of a hand rail both after installation and periodically is disclosed in U.K. Patent Number GB 2,091,888. This device wedges between the railing and an adjacent structure, and expands with a hydraulic cylinder to load the hand rail. The hydraulic pressure is then measured to determine the loading. This device is functional, but the hydraulic cylinder adds significantly to its weight, and an integral dolly, disclosed in the patent, is required to maneuver the device. This makes it more difficult to transport the device from site to site. Additionally, a solid adjacent structure is required to test the railing, and therefore the disclosed device is not suitable for testing all hand rails. Finally, the inclusion of hydraulics increases the cost of the disclosed testing apparatus because it necessitates the expense of a devoted hydraulic cylinder, gauge, and hydraulic fittings.

Therefore, there is a need for a portable hand rail testing apparatus that has universal applicability to many hand rail installations. Since it is desirable to test the hand rails once installed, the device should be light weight and maneuverable, so that it can be easily transported to the hand rail location. The testing apparatus must be compact to allow testing of handrails in confined areas, and it should also be simple and inexpensive to build, so that many testing devices can be built.

SUMMARY OF THE INVENTION

The present invention is directed towards an inexpensive, portable hand rail testing apparatus with universal applicability to many hand rail installations. The invention is an apparatus for testing the structural integrity of a hand rail structure. The hand rail has a plurality of horizontal parallel rail members. The apparatus includes an elongate lever arm wit h a mounting portion on the lever arm sized to span at least two rail members. A receptacle on the mounting portion opposite the lever arm receives one of the rail members and vertically supports the lever arm and mounting portion. A vertical force applied to the lever arm is transmitted to the hand rail.

Further, the apparatus has a force measuring device on the lever arm. The force is applied through the force measuring device. The force measuring device may be a torque wrench. The mounting portion is on a distal end of the lever arm and the force measuring device is on a proximal end of the lever arm. A second receptacle is on the mounting portion positioned to receive a second parallel rail member. The second receptacle is moveable relative to the first mentioned receptacle. The first mentioned receptacle supports the lever arm and mounting portion when the force is applied in a first vertical direction. The second receptacle supports the lever arm and mounting portion when the force is applied in a second vertical direction. The receptacle can be removed and replaced with a different receptacle.

BRIEF DESCRIPTION OF THE DRAWINGS

FIG. 3 is a rear view of a hand rail testing apparatus constructed in accordance with this invention.

DETAILED DESCRIPTION OF THE PREFERRED EMBODIMENT

Figure 1:
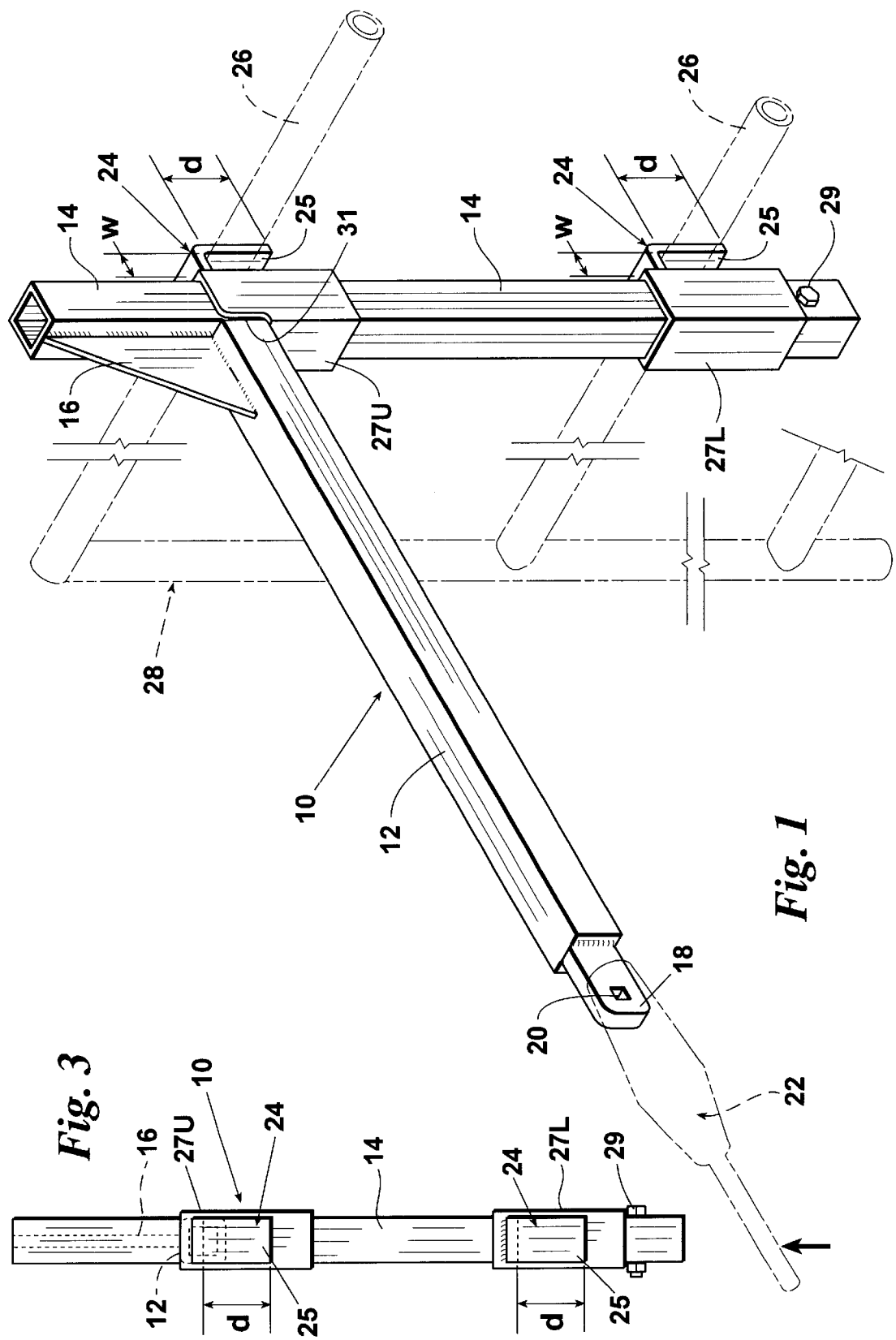
FIG. 1 is a front perspective view of a hand rail testing apparatus constructed in accordance with this invention.

Reference is now made to the drawings wherein like reference characters denote like or similar parts throughout the FIGURES. Referring first to FIG. 1 and FIG. 3, a hand rail testing apparatus 10 constructed in accordance with this invention generally comprises an elongate lever arm 12 joined at a distal end in substantially perpendicular relation to an elongate mounting portion 14. In the disclosed embodiment arm 12 and mounting portion 14 are joined rigidly, and each have a high moment of inertia about an axis parallel to a central axis of arm 12. Preferably, arm 12 and mounting portion 14 are tubular and relatively lightweight, but could be any other cross-section that has a high moment of inertia in at least the one direction and relative low weight. It is also preferred that arm 12 and mounting portion 14 be constructed from commonly available, pre-formed structural shapes such as box or round tubing. This both minimizes the cost, and maximizes the availability of materials needed to construct testing apparatus 10.

A gusset 16 spans the juncture of arm 12 and mounting portion 14 to further stiffen the connection. Gusset 16 is preferably planar, and formed from a piece of inexpensive plate; however, gusset 16 may be any other suitable shape and material combination.

A proximal end of lever arm 12 has a wrench interface portion 18. Wrench interface portion 18 is a generally planar extension having an opening 20 adapted to receive a drive (not shown) of a force measuring device. In the disclosed embodiment, the force measuring device is a conventional torque wrench. Torque wrench 22 (FIG. 2) is preferably a non-ratcheting type torque wrench, and is chosen to have a measuring capacity high enough to test to the desired loading. Wrench interface portion 18 is in a plane parallel to the central axis of 12. Generally, opening 20 will be square, because the drive of conventional torque wrenches are square. In the disclosed embodiment the opening 20 has a square configuration; however, it is within the scope of this invention to provide any required interface, either in size or shape, to join a drive to the arm 12. Also, while use of a separate, conventional torque wrench is preferred, it is within the scope of this invention to integrally build the torque measuring components of a torque wrench into arm 12 to produce a functional equivalent of the disclosed torque wrench 22 and arm 12 combination.

Figure 2:
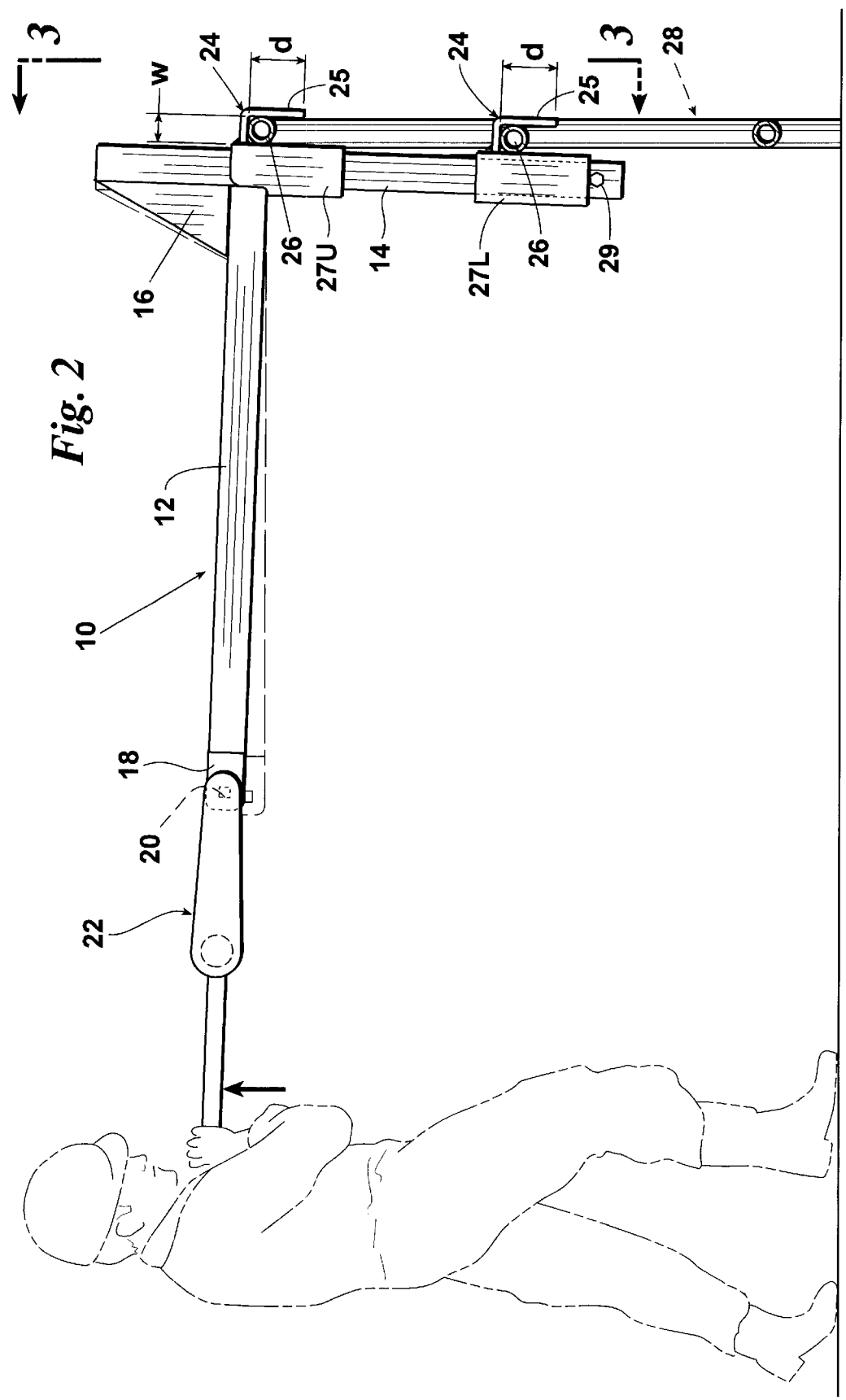
FIG. 2 is a side view of a hand rail testing apparatus constructed in accordance with this invention in use.

Tubular mounting portion 14 has at least one, and preferably two or more, mounting assemblies 24 for engaging horizontal rails 26 of a hand rail 28. In the disclosed embodiment, each mounting assembly 24 includes a receptacle 25. In the disclosed embodiment, receptacle 25 comprises downwardly disposed L-shaped members extending outward and downward from a tubular receiving portion 27. It will be understood by those skilled in the art that receptacle 25 may assume a number of different configurations capable of grasping rail 26. Possible other configurations may be a U-shape with closure or a C-clamp with adjustable closure member. Receptacle 25 is adapted to accept rail 26, and has a depth d preferably greater than half the largest vertical dimension of rail 26 and a width w sized to receive a rail 26. In the embodiment disclosed, mounting assembly 24 includes an upper receiving portion 27U. The embodiment disclosed further includes a lower receiving portion 27L. Upper receiving portion 27U and lower receiving portion 27L are sized to closely receive and slide on mounting portion 14. Lower receiving portion 27L is retained on mounting portion 14 by a removable stop 29 positioned at a lower end of mounting portion 14. Stop 29 is preferably a bolt threaded into mounting portion 14. It is anticipated that if testing apparatus 10 is to be used with hand rails 28 of various rail 26 widths, an alternate set of mounting assemblies 24 can be maintained, and easily substituted to accommodate the different railing 26. Referring to FIG. 2, an upper receiving portion 27U slides onto mounting portion 14 from a lower end to abut lever arm 12. It may be desirable to provide a notch 31 in upper receiving portion 27U such that receptacle 25 better aligns with lever arm 12. If desired a second stop 29 (not shown) may be inserted to retain upper receiving portion 27U in place. In an alternate embodiment, upper first mounting assembly 24 may be fixably attached to lever arm 12 and/or mounting portion 14 by any conventional manner such as welding.

In another embodiment, receptacle 25 may be fixably attached directly to the mounting portion. Such an alternate embodiment is simpler to construct but does not provide the versatility of engaging different sized and spaced horizontal hand rails.

In use, receptacle 25 is placed over rail 26, and supports hand rail testing apparatus 10 hanging from rail 26. Mounting portion 14 spans at least two horizontal rails 26 when mounting assembly 24, abutting lever arm 12, engages rail 26. Thus, as testing apparatus 10 hangs from rail 26, mounting portion 14 abuts a second rail 26. If a second mounting assembly 24 is used, second receptacle 25 accepts a second rail 26. In this position, lever arm 12 extends horizontally outward and generally perpendicular to hand rail 28. The drive of a conventional torque wrench 22 is received in wrench interface portion 18. A user may then apply a measured amount of force to torque wrench 22 to apply a corresponding torque to hand rail 28. When force is applied to wrench 22, a balancing couple is created with one mounting assembly 24 pulling on railing 26 and a reaction force on mounting portion 14 by a second railing 26. If two mounting assemblies 24 are used, force can be applied both vertically upward and downward, because at least one receptacle 25 grasps a railing 26 when force is applied in either direction. This is preferred, so that the tool 10 need not be removed to test hand rail 28 in both directions. A torque magnitude can be read from torque wrench 22, and localized loading can be calculated for various portions of hand rail 28.

One regulation presently requires hand rails 28 to withstand a 200 lb loading applied at the top rail 26 in any direction. The maximum loading on hand rail 28 is when the load is applied horizontally to the top rail 26, and thus produces a maximum moment at the base of the hand rail 28. The length of arm 12 is sized to allow an average worker to achieve an equivalent moment at the base of hand rail 28, thereby testing the integrity of the lower portion of hand rail 28. For example, hand rails 28 ranging from 39.5" in height to 46" in height would preferably use an arm 12 that is 2'-5" long to replicate the 200 lb load with a 150 lb to 175 lb force at the torque wrench 22. It will be readily understood by one skilled in the art that the length of arm 12 can be varied to vary the load applied by the user or vary the load seen by the hand rail 28, and that the above lengths are provided herein for purposes of example only.

The present invention has several significant advantages. The hand rail testing apparatus constructed in accordance with this invention is inexpensive to construct, and has universal application as it will accept most common hand rail forms in use today. Further, it utilizes a conventional torque wrench as the force measuring apparatus which obviates the need for expensive testing equipment. The device is constructed from inexpensive off-the-shelf materials and can be constructed by workmen with rudimentary tools in the field. The tubular components help reduce the overall weight of the hand rail testing apparatus while retaining strength and stiffness in the required directions. Because of its light weight, it is portable and can be transported from site to site.

It will be recognized by those skilled in the art that the innovative concepts disclosed in the present application can be applied in a variety of contexts. Moreover, the preferred implementation can be modified in a tremendous variety of ways. Accordingly, it should be understood that the disclosed embodiment and modifications and variations suggested above are merely illustrative. These examples may help to show some of the scope of the inventive concepts described herein, but these examples do not narrowly exhaust the full scope of variations of the present invention. It will be understood that the invention is not limited to the embodiment disclosed without departing from the scope of the invention as claimed.

We claim:

1. An apparatus for testing the structural integrity of a hand rail assembly, the hand rail assembly having at least two substantially horizontal and substantially parallel rail members, said apparatus for testing, comprising:
   an elongate lever arm;
   a mounting portion disposed on the distal end of the lever arm adapted to span at least two rail members;
   at least one receptacle on the mounting portion opposite the lever arm adapted to receive one of the rail members and vertically supporting the arm and mounting portion; and
   wherein a force applied to the lever arm is transmitted to the hand rail assembly.

2. The apparatus of claim 1 further comprising:
   a force measuring device disposed on the proximal end of the lever arm; and
   wherein the force is applied through the force measuring device.

3. The apparatus of claim 2 wherein the force measuring device is a torque wrench.

4. The apparatus of claim 1 wherein the receptacle is a downwardly disposed L-shaped member.

5. The apparatus of claim 1 wherein the receptacle is movable relative to the elongate lever arm.

6. The apparatus of claim 1 further comprising a second receptacle on the mounting portion positioned to receive a second substantially parallel rail member.

7. The apparatus of claim 6 wherein the first mentioned receptacle supports the lever arm and mounting portion when a first force is applied in a first downward vertical direction and the second receptacle supports the lever arm and mounting portion when an alternative second force is applied in a second upward vertical direction.

8. The apparatus of claim 6 wherein the second receptacle is moveable relative to the first mentioned receptacle.

9. The apparatus of claim 1 wherein the receptacle is interchangeable with a different receptacle.

10. A load testing device for a hand rail assembly, the hand rail assembly having at least two substantially horizontal railings, comprising:
    a mounting portion for engaging at least one railing such that the mounting portion is supported vertically adjacent the railings;
    a lever arm extending outward from the mounting portion for receiving a force and transmitting the force to the hand rail assembly; and
    a force measuring device on the lever arm for measuring the force applied to the hand rail assembly.

11. The device of claim 10 wherein the force measuring device is a torque wrench, and the force is applied through the torque wrench to the lever arm.

12. The device of claim 11 wherein the force measuring device is on a proximal end of the lever arm and the mounting portion is on a distal end of the lever arm.

13. The device of claim 10 wherein the mounting portion has at least one receptacle opposite the lever arm for receiving one of the horizontal railing members and vertically supporting the mounting portion.

14. The device of claim 13 wherein the receptacle is interchangeable with a different receptacle.

15. The device of claim 14 wherein the receptacle is a downwardly disposed L-shaped member.

16. The device of claim 10 wherein the mounting portion has a first receptacle opposite the lever arm for receiving one of the horizontal railing members and supporting the mounting portion and lever arm when the force is applied in a first vertical direction and a second receptacle opposite the lever arm for receiving a second horizontal railing member and supporting the mounting portion and lever arm when the force is applied in a second vertical direction.

17. The device of claim 16 wherein the second receptacle is moveable relative to the first receptacle.

18. A method of testing the structural integrity of a hand rail assembly comprising the steps of:
    supporting a lever arm from a horizontal rail of a hand rail assembly to extend generally horizontal;
    joining a force measuring device to the lever arm; and
    applying force in a first vertical direction through the force measuring device and lever arm.

19. The method of claim 18 further comprising the step of:
    applying force in a second vertical direction through the force measuring device and lever arm.

20. The method of claim 18 wherein the force is applied near an end of the lever arm.

21. A method of testing the structural integrity of a hand rail assembly having at least two substantially horizontal and substantially parallel rail members, said method comprising the steps of:
    providing an apparatus for testing the hand rail assembly wherein said apparatus includes an elongate lever arm, a mounting portion disposed on the distal ends of the lever arm adapted to span at least two rail members, and at least one receptacle on the mounting portion opposite the lever arm for receiving one of the horizontal rail members;
    supporting the lever arm from the horizontal rail of the hand rail assembly by engaging the receptacle of the mounting portion with one of the horizontal rail members;
    joining a force measuring device to the lever arm; and
    applying force in a first vertical direction through the force measuring device and lever arm.

* * * * *